United States Patent
Wang et al.

[11] Patent Number: 5,694,438
[45] Date of Patent: Dec. 2, 1997

[54] METHOD AND APPARATUS FOR MANAGING A DATA SYMBOL RECEIVED IN A TIME DIVERSITY COMMUNICATION SYSTEM

[75] Inventors: Annie Yalay Wang; Mark Howard Babcock, both of Austin, Tex.; David Hayes, Lake Worth; Ronald Evoy, West Palm Beach, both of Fla.

[73] Assignee: Motorola, Inc., Schaumburg, Ill.

[21] Appl. No.: 552,157

[22] Filed: Nov. 2, 1995

[51] Int. Cl.$^6$ .................................................. H04B 7/10
[52] U.S. Cl. ........................ 375/347; 395/410; 395/421.1
[58] Field of Search ................................. 375/347, 346, 375/348, 260, 267, 374, 340; 455/33.1, 137, 276.1, 269; 371/37.1, 37.8; 340/825.52, 825.54, 825.65; 395/421.1, 421.09, 410; 364/955, 960.2, 961.3

[56] References Cited

U.S. PATENT DOCUMENTS 3,973,242  8/1976  Field et al. .......................... 340/168
4,506,385  3/1985  Fedde et al. ........................ 455/226
5,440,590  8/1995  Birchler et al. ..................... 375/347

*Primary Examiner*—Wellington Chin
*Assistant Examiner*—William Luther
*Attorney, Agent, or Firm*—James A. Lamb

[57] ABSTRACT

A method and apparatus (400) manages a current data symbol received by a receiver (122) in a frame of data of a time diversity communication system (102, 104). A symbol counter (402) counts a signal (404) from a symbol clock synchronized to the frame of data to provide a count of the current data symbol, and a bit line translator (416) maps a current address from the count. A conditional processor (434) derives a selected memory address from the current address. Then, based upon the current address, a comparator (424) makes a choice among (a) storing the current data symbol in a memory at the selected memory address, (b) merging the current data symbol with an earlier received data symbol stored at the selected memory address during an earlier frame of data, and (c) ignoring the current data symbol.

18 Claims, 9 Drawing Sheets

METHOD AND APPARATUS FOR MANAGING A DATA SYMBOL RECEIVED IN A TIME DIVERSITY COMMUNICATION SYSTEM

RELATED APPLICATION

Application Ser. No. 08/499,261, filed Jul. 7, 1995 by Powell et al., entitled "Method and Apparatus for Detecting Data Symbols in a Diversity Communication System."

FIELD OF THE INVENTION

This invention relates in general to radio communication systems, and more specifically to a method and apparatus for managing a data symbol received in a time diversity communication system.

BACKGROUND OF THE INVENTION

Digital radio communication protocols have been developed for communication receivers that reside in an environment in which the probability of receiving an error-free message can be improved significantly by transmitting the same messages multiple times. One such time diversity protocol is based upon Motorola's well-known FLEX™ protocol. This time diversity protocol is defined by the standard FLEX™ frame divided into multiple sub-frames with fixed boundaries depending on the number of repeat transmissions.

The time diversity protocol requires that new and repeated data be retained on a per symbol basis from a first transmission of the data until a last repeated transmission of the data. Preferably, repeated data is evaluated for quality and then merged intelligently with corresponding data that was received and stored earlier.

Thus, what is needed is a method and apparatus for managing a current data symbol received in a frame of data of a time diversity communication system. Preferably, the method and apparatus will distinguish new data from repeated data and will store the data in a manner that facilitates real-time intelligent merging of repeated data with previously stored data. Also preferably, the method and apparatus will have the flexibility to accommodate a variety of systems having different numbers of repeats and different code block depths, and will utilize receiver battery power efficiently.

SUMMARY OF THE INVENTION

An aspect of the present invention is a method for managing a current data symbol received by a receiver in a frame of data of a time diversity communication system utilizing a repeated transmission of messages. The method comprises the steps of counting a signal from a symbol clock synchronized to the frame of data for providing a count of the current data symbol, and mapping a current address from the count. The method further comprises the steps of deriving a selected memory address from the current address by conditionally processing the current address, and making a choice among (a) storing the current data symbol in a memory at the selected memory address, (b) merging the current data symbol with an earlier received data symbol stored at the selected memory address during an earlier frame of data, and (c) ignoring the current data symbol, wherein the choice made is based upon the current address.

Another aspect of the present invention is a data symbol manager for managing a current data symbol received by a receiver in a frame of data of a time diversity communication system utilizing a repeated transmission of messages. The data symbol manager comprises a symbol counter coupled to a symbol clock synchronized to the frame of data for providing a count of the current data symbol, and a bit line translator coupled to the symbol counter for mapping a current address from the count. The data symbol manager further comprises a conditional processor coupled to the bit line translator for deriving a selected memory address from the current address by conditionally processing the current address, and a store/merge/ignore comparator coupled to the bit line translator for making a choice among (a) storing the current data symbol in a memory at the selected memory address, (b) merging the current data symbol with an earlier received data symbol stored at the selected memory address during an earlier frame of data, and (c) ignoring the current data symbol, wherein the choice made is based upon the current address.

DESCRIPTION OF THE PREFERRED EMBODIMENT

Figure 1:
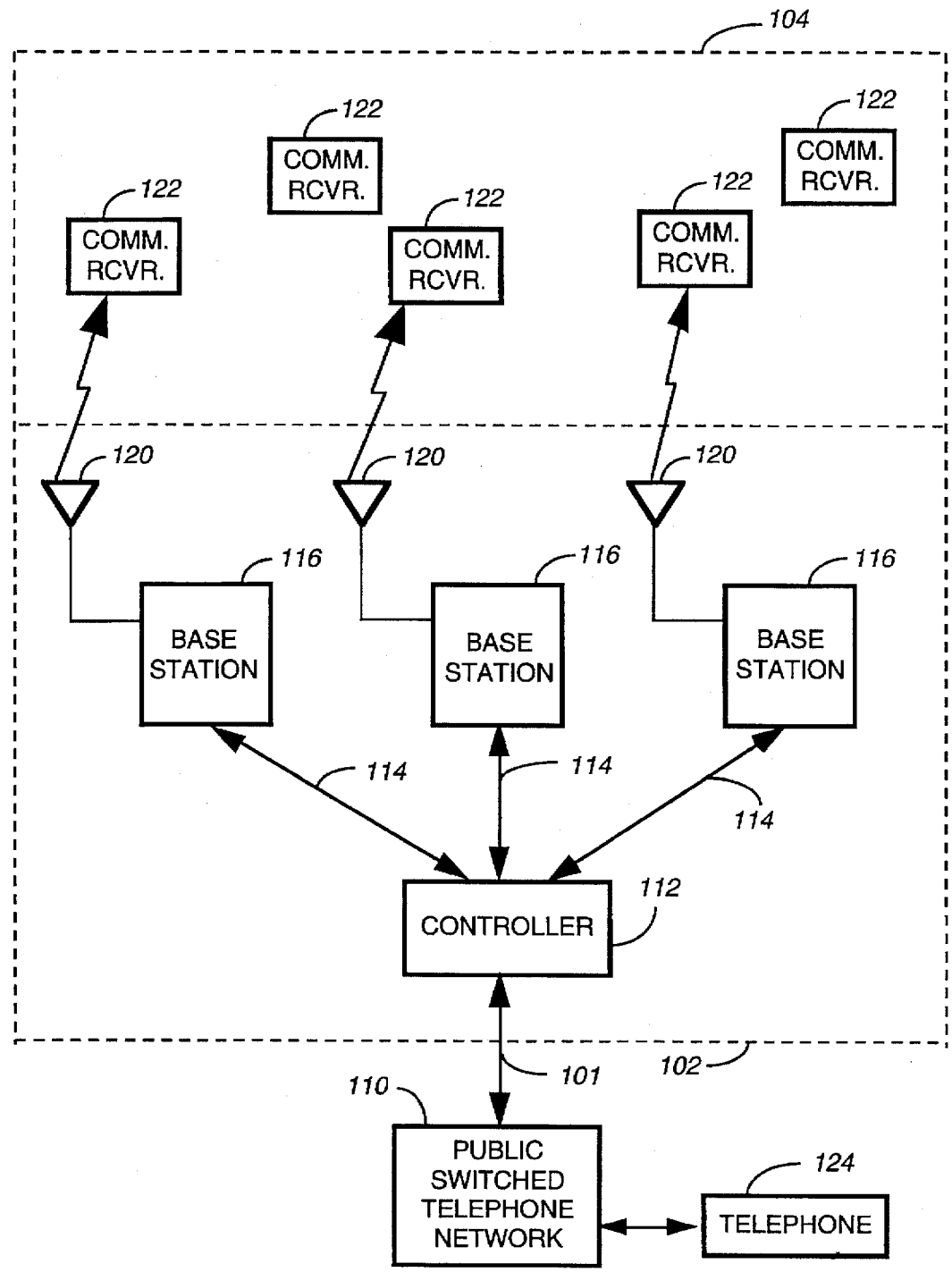
FIG. 1 is an electrical block diagram of a communication system in accordance with the preferred embodiment of the present invention.

Referring to FIG. 1, an electrical block diagram of a time-diversity communication system in accordance with the preferred embodiment of the present invention comprises a fixed portion 102 and a portable portion 104. The fixed portion 102 includes a plurality of base stations 116, for communicating with the portable portion 104, utilizing conventional transmission techniques well known in the art, and coupled by communication links 114 to a controller 112 which controls the base stations 116. The hardware of the controller 112 is preferably a combination of the Wireless Messaging Gateway (WMG™) Administrator!™ paging terminal and the RF-Conductor!™ message distributor manufactured by Motorola, Inc. The hardware of the base stations 116 is preferably a Nucleus® Orchestra!™ transmitter manufactured by Motorola, Inc. It will be appreciated that other similar hardware can be utilized for the controller 112 and base stations 116.

Each of the base stations 116 transmits radio signals to the portable portion 104 comprising a plurality of communication receivers 122 via a transmitting antenna 120. The radio signals comprise selective call addresses and message transactions between the base stations 116 and the communication receivers 122. The controller 112 preferably is coupled by conventional telephone links 101 to a public switched telephone network (PSTN) 110 for receiving selective call messages therefrom. The selective call messages comprise voice and data messages received from the PSTN 110 using, for example, a conventional telephone 124 coupled to the PSTN 110 in a manner well known in the art.

Data and control transmissions between the base stations 116 and the communication receivers 122 preferably utilize an outbound protocol such as the Motorola FLEX™ digital selective call signaling protocol described more fully in U.S. Pat. No. 5,168,493 issued Dec. 1, 1992 to Nelson et al., and assigned to the assignee of the present invention and which is hereby incorporated herein by reference. This protocol utilizes well-known error detection and error correction techniques and is therefore tolerant to bit errors occurring during transmission, provided that the bit errors are not too numerous in any one code word. To further enhance the communication reliability the protocol preferably is modified to utilize time diversity transmissions in accordance with the preferred embodiment of the present invention, as described herein below.

Transmissions comprising data and control signals from the base stations 116 preferably utilize two and four-level frequency shift keyed (FSK) modulation. It will be appreciated that, alternatively, other error detecting and error correcting signaling protocols, modulation schemes, and transmission rates can be utilized as well.

Figure 2:
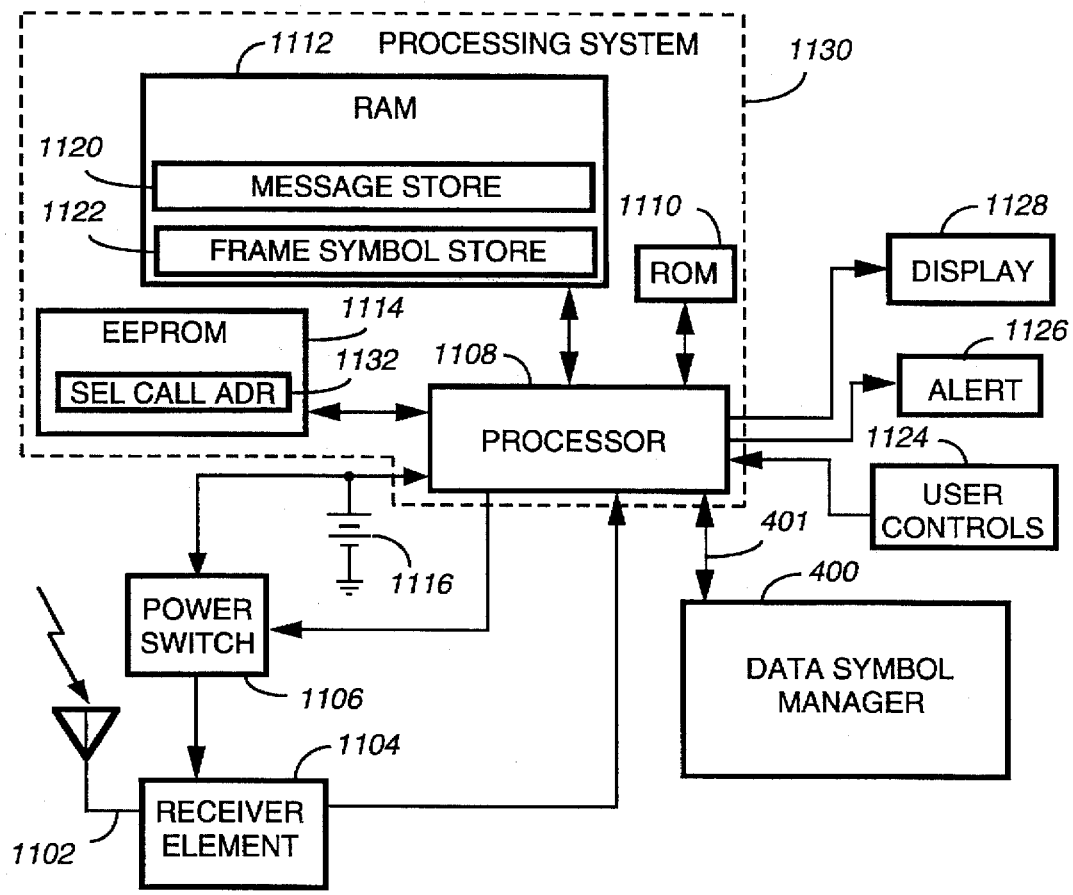
FIG. 2 is an electrical block diagram of a communication receiver in accordance with the preferred embodiment of the present invention.

FIG. 2 is an electrical block diagram of the communication receiver 122 in accordance with the preferred embodiment of the present invention. The communication receiver 122 comprises a receiver antenna 1102 for intercepting RF signals from the base stations 116. The receiver antenna 1102 is coupled to a receiver element 1104, which includes a receiver utilizing conventional demodulation techniques for receiving the communication signal from the base stations 116. The RF signals received from the base stations 116 use conventional two and four-level FSK. Radio signals received by the receiver element 1104 produce demodulated information, which is coupled to a processing system 1130 for processing messages received from the base stations 116.

A conventional power switch 1106, coupled to the processing system 1130, is used to control the supply of power from a battery 1116 to the receiver element 1104, thereby providing a battery saving function.

To perform the necessary functions of the communication receiver 122, the processing system 1130 comprises a processor 1108 coupled to a random access memory (RAM) 1112, a read-only memory (ROM) 1110, and an electrically erasable programmable read-only memory (EEPROM) 1114. Preferably, the processor 1108 is similar to the M68HC08 microcontroller manufactured by Motorola, Inc. It will be appreciated that other similar processors can be utilized for the processor 1108, and that additional processors of the same or alternative type, as well as a hardware decoder, can be added as required to handle the processing requirements of the processing system 1130. It also will be appreciated that other types of memory, e.g., EEPROM or FLASH, can be utilized for the ROM 1110, as well as the RAM 1112. It will be further appreciated that the RAM 1112 and the ROM 1110, singly or in combination, can be incorporated as an integral portion of the processor 1108.

In accordance with the present invention, the communication receiver 122 also includes a data symbol manager 400 coupled to the processing system 1130 through a data bus 401. The data symbol manager 400 cooperates with the processing system 1130 to manage each data symbol as the data symbol is received by the communication receiver 122 in accordance with the time diversity transmissions of the message. The data symbols of each frame of data are stored in a frame symbol store 1122 of the RAM 1112. Operation of the data symbol manager 400 will be described further below.

The processing system 1130 is programmed by way of the ROM 1110 to further process the incoming message after the last repeated transmission of the message has been received. During the further message processing, the processor 1108 conventionally decodes an address in the demodulated data of the message, compares the decoded address with one or more selective call addresses 1132 stored in the EEPROM 1114, and when a match is detected, the processor 1108 proceeds to process the remaining portion of the message.

Once the processor 1108 has processed the message, it stores the message in the message store 1120 of the RAM 1112, and a call alerting signal is generated to alert a user that a message has been received. The call alerting signal is directed to a conventional audible or tactile alerting device 1126 for generating an audible or tactile call alerting signal.

The message can be accessed by the user through user controls 1124, which provide functions such as lock, unlock, delete, read, etc. More specifically, by the use of appropriate functions provided by the user controls 1124, the message is recovered from the message store 1120, and then displayed on a display 1128, e.g., a conventional liquid crystal display (LCD).

Figure 3:
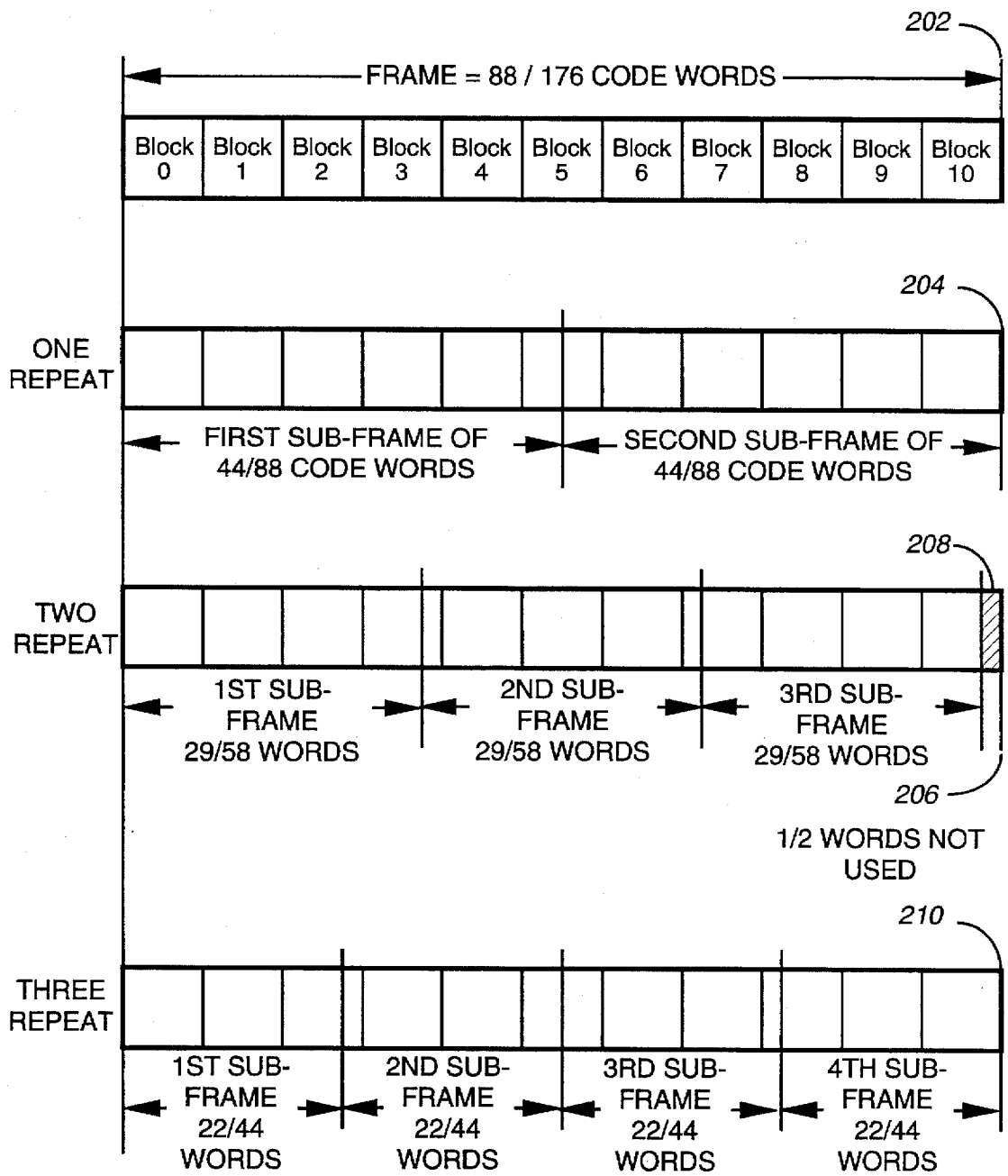
FIG. 3 is a timing diagram of a sub-frame structure of a time diversity protocol used in the communication system in accordance with the preferred embodiment of the present invention.

FIG. 3 depicts a timing diagram of a sub-frame structure of the time diversity protocol used in the communication system in accordance with the preferred embodiment of the present invention. A frame diagram 202 depicts the eleven code blocks of the standard FLEX™ protocol frame. The frame comprises either 88 or 176 code words, 88 code words corresponding to either 1600 bps two-level encoding or 3200 bps four-level encoding, and 176 code words corresponding to either 3200 bps two-level encoding or 6400 bps four-level encoding. In addition to the eleven code blocks, the frame includes a synchronization portion (not shown) which precedes the first block. The synchronization portion includes a frame information word that indicates, among other things, the number of repeats utilized for the time diversity transmissions.

A one-repeat diagram 204 depicts the sub-frame structure utilized for a one-repeat system. As shown in the one-repeat diagram 204, the frame is evenly divided into two sub-frames, each transmitting either 44 or 88 code words. The first sub-frame is used for transmitting new data, and the second sub-frame is used for transmitting repeated data, though not the same data as transmitted in the first subframe, as will be further explained herein below.

A two-repeat diagram 206 depicts the sub-frame structure utilized for a two-repeat system. Here the frame is evenly divided into three subframes, each transmitting either 29 or 58 code words. The first sub-frame is used for transmitting new data, and the second and third sub-frames are used for transmitting repeated data. Because the even number of code words in the FLEX™ protocol frame cannot be evenly divided by three, one or two words 208 (depending on the bit rate) are not used in the two-repeat system.

A three-repeat diagram 210 depicts the sub-frame structure utilized for a three-repeat system. As shown in the three-repeat diagram 210, the frame is evenly divided into four sub-frames, each transmitting either 22 or 44 code words. The first sub-frame is used for transmitting new data, and the second, third, and fourth sub-frames are used for transmitting repeated data.

Figure 4:
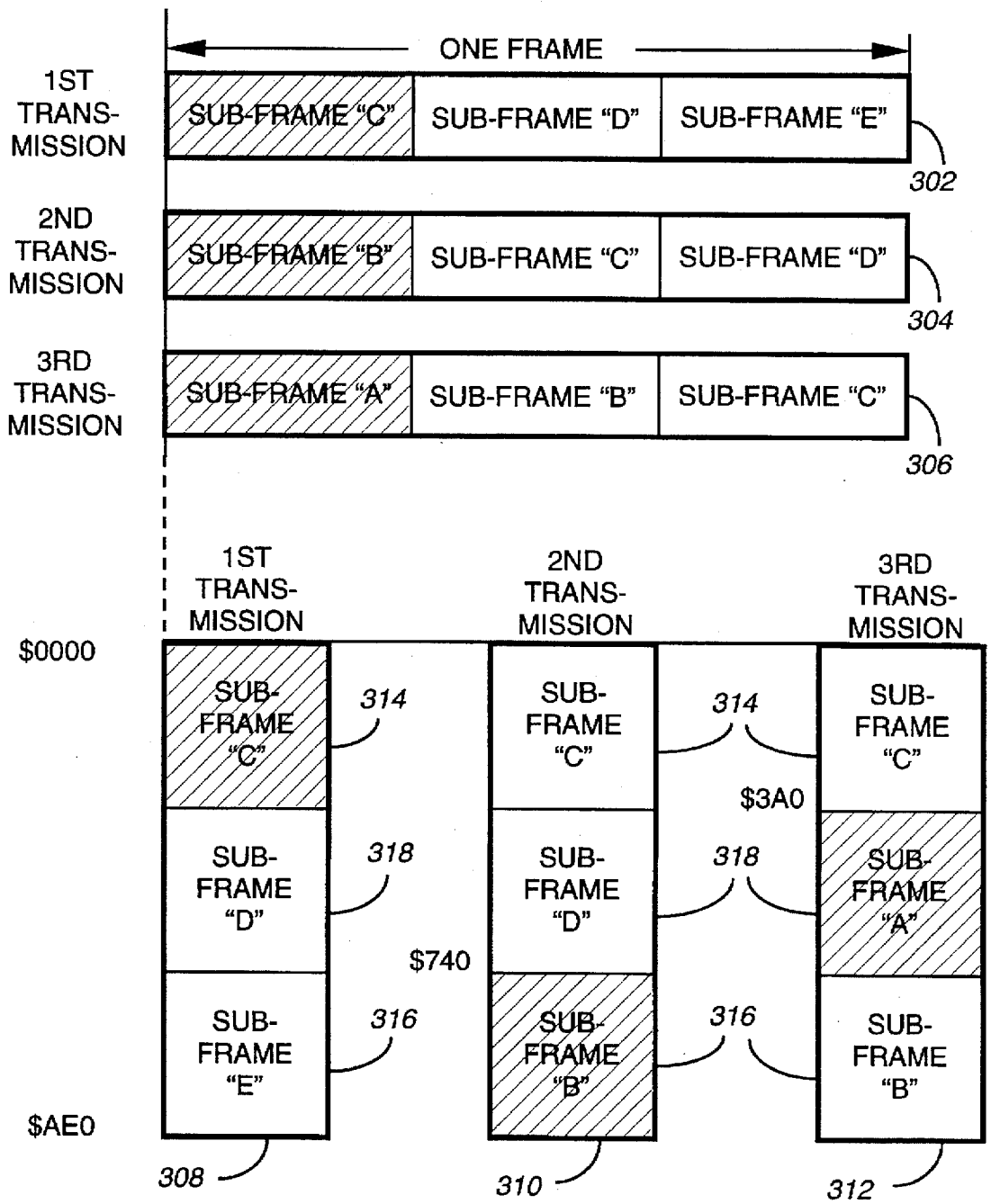
FIG. 4 is a timing and memory storage diagram for a two-repeat frame structure of the protocol depicting corresponding memory locations utilized for storing the data in a receiver in accordance with the preferred embodiment of the present invention.

FIG. 4 is a timing and memory storage diagram of a two-repeat frame structure of the protocol depicting corresponding memory locations utilized for storing the data in a receiver in accordance with the preferred embodiment of the present invention. By way of example, first, second, and third frame transmissions 302, 304, 306 are shown. The first frame transmission 302 includes a first sub-frame "C" containing new data (cross-hatched), and second and third sub-frames "D" and "E" containing repeated data (not cross-hatched). The second frame transmission 304 includes a first sub-frame "B" containing new data, and second and third sub-frames "C" and "D" containing repeated data. The third frame transmission 306 includes a first sub-frame "A" containing new data, and second and third sub-frames "B" and "C" containing repeated data. Note that the first sub-frame always contains new data, and that the data is repeated once in the second sub-frame of a frame following the frame that introduced the new data and then repeated once again in the third sub-frame of a frame after that.

A first transmission memory storage diagram 308 shows, by way of example, that the new data symbols of sub-frame "C" are stored in a first partition 314 of the frame symbol store 1122 beginning at address $0000 during reception of the first frame transmission 302. A second transmission memory storage diagram 310 shows that, during reception of the second frame transmission 304, the data symbols of sub-frame "C" remain in the first partition 314 of the frame symbol store 1122, and that the new data symbols of sub-frame "B" are stored in a third partition 316 of the frame symbol store 1122 beginning at address $0740. The repeated symbols of sub-frame "C" that are received during the second frame transmission 304 are intelligently merged with the symbols stored in the first partition 314. A third transmission memory storage diagram 312 shows that, during reception of the third frame transmission 306, the data symbols of sub-frame "C" again remain in the first partition 314 of the frame symbol store 1122, and that the new data symbols of sub-frame "A" are stored in a second partition 318 of the frame symbol store 1122 beginning at address $03A0. The repeated symbols of sub-frame "C" that are received during the third frame transmission 306 again are intelligently merged with the symbols stored in the first partition 314.

The intelligent merging process preferably utilizes a received quality indicator that is calculated for and stored with each of the received data symbols. The quality indicator preferably is based upon the accuracy of the received symbol value, e.g., the detected frequency deviation, compared to a predetermined theoretical value corresponding to the symbol. If the quality indicator stored with a stored data symbol in the frame symbol store 1122 indicates, for example, a lower quality than the quality indicator calculated for a corresponding repeated symbol, then the processor 1108 replaces the stored symbol and the stored quality indicator with the repeated symbol and its quality indicator. It will be appreciated that, alternatively, other forms of intelligent merging, such as the use of a received signal strength indicator for generating the quality indicator, can be utilized as well in the intelligent merging process. A preferred intelligent merging process is fully described in application Ser. No. 08/499,261, filed Jul. 7, 1995 by Powell et al., entitled "Method and Apparatus for Detecting Data Symbols in a Diversity Communication System", which Application is hereby incorporated herein by reference.

After completion of each frame transmission 302, 304, 306, the stored symbols of sub-frame "C" are examined by the processing system 1130 to determine whether a received address contained therein matches the one or more selective call addresses 1132. If so, and if the message contains no uncorrectable errors, the corresponding message is moved to the message store 1120.

The preceding description of the timing and memory storage diagram of the two-repeat frame structure has concentrated on the processing and storage of the sub-frame "C" data symbols. Further observation of FIG. 4 will reveal that a similar processing and storage occurs for each of the other sub-frames "A", "B", "D", and "E" the essential difference being that the storage location utilized for the new data symbols of each of the first sub-frames rotates in a predetermined order among the first, second, and third partitions 314, 318, 316.

Figure 5:
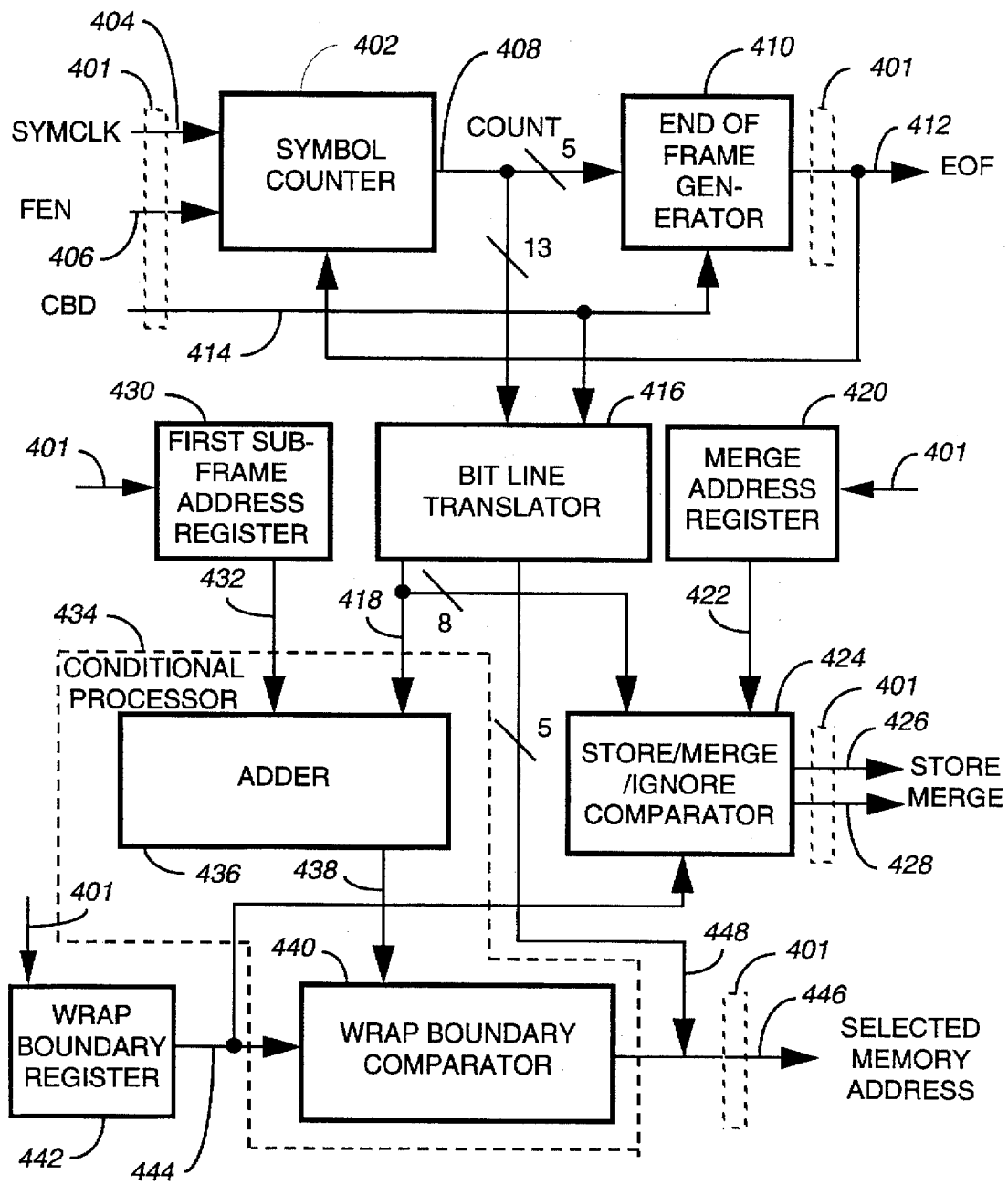
FIG. 5 is an electrical block diagram of a data symbol manager for managing a current data symbol in accordance with the preferred embodiment of the present invention.

FIG. 5 is an electrical block diagram of the data symbol manager 400 for managing a current data symbol in accordance with the preferred embodiment of the present invention. The data symbol manager 400 comprises a symbol counter 402, an end-of-frame generator 410, a bit line translator 416, a store/merge/ignore comparator 424, a conditional processor 434 comprising an adder 436 and a wrap boundary comparator 440, and three software programmable registers: a first sub-frame address register 430, a merge address register 420, and a wrap boundary register 442.

The symbol counter 402 is a conventional 13-bit synchronous counter which counts a symbol clock signal 404 generated by the processor 1108 and synchronized to the frames of data received by the communication receiver 122 in a manner well-known in the art. The symbol counter 402 is cleared at the beginning of each frame of data and restarted by a frame enable (FEN) signal 406. The five most significant bits of the counter output 408 are monitored by the end-of-frame generator 410 for generating an end-of-frame (EOF) signal 412, wherein the EOF value is a predetermined value of $B00 or $1600 for code block size 8×32 or 16×32, respectively, (1 frame×11 blocks/frame×8× 32 symbols/block=2816 symbols=$B00, or 1 frame×11 blocks/frame×16×32 symbols/block=5632 symbols= $1600). The EOF generator 410 utilizes conventional combinational logic gates to generate the EOF signal 412 in a manner well known in the art whenever the counter output 408 reaches $B00 or $1600, the value $B00 or $1600 selected by a code block depth (CBD) signal 414 coupled to the EOF generator 410. The EOF signal 412 is coupled to the processor 1108 and coupled to the symbol counter 402 for signaling the EOF thereto at the end of each frame of data. Preferably, the EOF signal stops the symbol counter (402) until the next frame enable signal (406).

Figure 6:
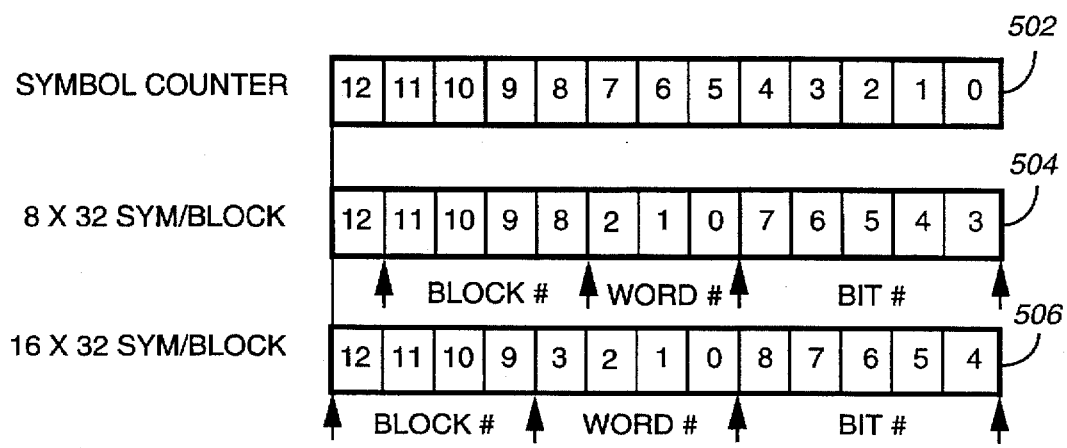
FIG. 6 is a diagram depicting a bit mapping of a symbol count into a corresponding current address in accordance with the preferred embodiment of the present invention.

The order of the 13 bits of the counter output 408 is rearranged by the bit line translator 416 in response to the CBD signal to achieve de-interleaving of the code blocks of the frames of data by causing symbols of the same code word to be stored in increments of one in the frame symbol store 1122. Referring to FIG. 6, a diagram depicts a bit mapping of the counter output 408 into a corresponding current address 418 in accordance with the preferred embodiment of the present invention. The symbol counter diagram 502 depicts the original bit positions of the counter output 408. The 8×32 diagram 504 depicts the mapped bit positions of the current address 418 for the 8×32 symbols per block system after rearrangement by the bit line translator 416. The 16×32 diagram 506 depicts the mapped bit positions of the current address 418 for the 16×32 symbols per block system after rearrangement by the bit line translator 416.

The allotted memory space in the frame symbol store 1122 preferably is a byte per symbol, $B00 bytes and $1600 bytes for 8×32 and 16×32 block depths respectively. Preferably, two bits of each byte are used for storing the symbol value, and the remaining six bits are used for storing the corresponding quality indicator. The first sub-frame transmitted in each frame always contains the new data; therefore, depending upon the number of repeats and the code block depth, a predetermined merge address in the frame symbol store 1122 that divides between new and repeating messages is loaded into the merge address register 420 by the processor 1108. A corresponding merge address signal 422 is then generated from the merge address register 420. The store/merge/ignore comparator 424 determines whether a current symbol falls into a store mode (for new data) or a merge mode (for repeated data), or neither mode (data to be ignored). If the current symbol falls into the store mode, the store/merge/ignore comparator 424 asserts a store signal 426. If the current symbol falls into the merge mode, the store/merge/ignore comparator 424 asserts a merge signal 428.

The address in the frame symbol store 1122 that is immediately above the highest address utilized for storing symbols is referred to as the wrap boundary address. Depending upon the number of repeats and the code block depth, a predetermined wrap boundary address is loaded into the wrap boundary register 442 by the processor 1108. The wrap boundary address is presented at a wrap boundary output 444 of the wrap boundary register 442. For the two-repeat system, which does not use the last one or two words of the frame, the wrap boundary output 444 is coupled to the store/merge/ignore comparator 424 for determining the symbols beyond the wrap boundary address to be in neither the store mode nor the merge mode.

Figure 7:
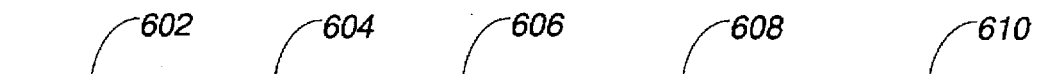
FIG. 7 is a table of memory addresses utilized in accordance with the preferred embodiment of the present invention.

FIG. 7 is a table of memory addresses utilized in accordance with the preferred embodiment of the present invention. The first column 602 indicates a choice of either the 8×32 code block depth or the 16×32 code block depth. The second column 604 indicates a choice of zero through three repeats, and an "all merge". (The "all merge" choice is used during repeated data frames in time diversity systems that send an entire frame of new data, followed by one or more entire frames of repeated data.) The third column 606 indicates the wrap boundary address. The fourth column 608 indicates one or more first sub-frame addresses (use described below) that correspond to the code block depth and number of repeats used in the system. The fifth column 610 indicates the merge address corresponding to the code block depth and number of repeats used in the system. The values in the table of memory addresses are programmed into the ROM 1110 so that the processing system 1130 can download the appropriate values to the first sub-frame address register 430, the merge address register 420, and the wrap boundary register 442, the appropriate values corresponding to the code block depth and number of repeats being utilized.

Figure 8:
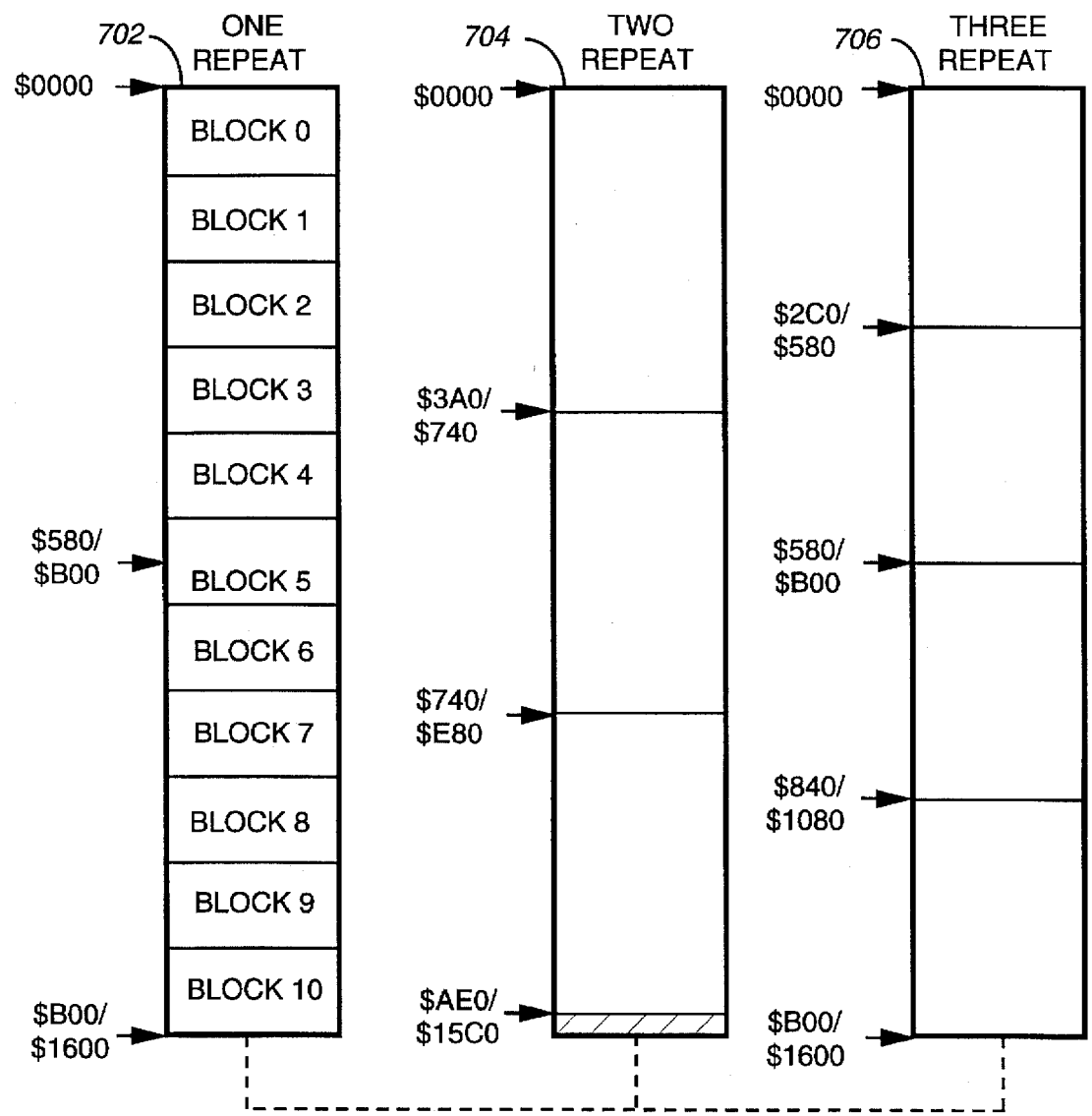
FIG. 8 is a memory map depicting data storage locations in accordance with the preferred embodiment of the present invention.

In order to use the same memory location for the same repeated symbol, it is necessary to know where in the frame symbol store 1122 the previously transmitted symbol was stored. This is accomplished by defining the addresses in the frame symbol store 1122 corresponding to the first sub-frames. Referring to FIG. 8, a memory map depicts data storage locations in accordance with the preferred embodiment of the present invention. First sub-frame addresses are shown for both the 8×32 and the 16×32 code block depth, as the address at the beginning of each sub-divided memory block for the one-repeat case 702, the two-repeat case 704, and the three-repeat case 706.

Referring again to FIG. 5, the adder 436 performs addition of the current address 418 and a predetermined address offset at the output 432 of the first sub-frame address register 430 to establish an intermediate address 438, which is used as a selected memory address signal 446 for storing symbols of the first sub-frame, second sub-frame and so on, as long as the intermediate address 438 is less than the wrap boundary address. The predetermined address offset is one of the first sub-frame addresses corresponding to the code block depth and the number of repeats. For example, (see FIGS. 7 and 4) for the 8×32 code block depth and two repeats, the predetermined address offset for the new data of the first sub-frame repeatedly rotates through the addresses $0000, $03A0, and $0740 in a predetermined rotating pattern. The processing system 1130 keeps track of the current position in the predetermined rotating pattern in a conventional manner.

When the intermediate address 418 equals or exceeds the wrap boundary address, as is monitored by the wrap boundary comparator 440, the wrap boundary comparator then subtracts the wrap boundary address from the intermediate address 438, to produce the selected memory address signal 446 in a sequence wrapped around the boundary, starting at $0000 and ending when the EOF signal 412 is set. The five least significant bits of the selected memory address signal 446 are provided directly from the bit line translator 416 through a bit number bus 448, because the conditional processor 434 processes only the eight most significant bits (comprising the block number and word number) of the current address 418.

Communication between the processing system 1130 and the data symbol manager 400 by the symbol clock signal 404, the FEN signal 406, the CBD signal 414, the EOF signal 412, the store signal 426, the merge signal 428, and the selected memory address signal 446 preferably takes place through the data bus 401. Communication between the first sub-frame address register 430, the merge address register 420, the wrap boundary register 442, and the processing system 1130 preferably also takes place through the data bus 401.

It will be appreciated that, alternatively, the functions of the data symbol manager 400 could instead be performed by the processing system 1130 under software control. Such a software process, however, would be processor intensive and would consume significantly more battery power. Performing the data symbol management functions in hardware in accordance with the present invention advantageously extends the life of the battery 1116 by minimizing the duties of the processing system 1130 in managing the time diversity symbols. Preferably, to minimize both power consumption and physical size, the data symbol manager 400 is incorporated into the processor 1108 as a single custom CMOS integrated circuit utilizing fabrication techniques well known in the art. It will be appreciated that, alternatively, the data symbol manager 400 can also be constructed as a separate integrated circuit outside the processor 1108.

Figure 9:
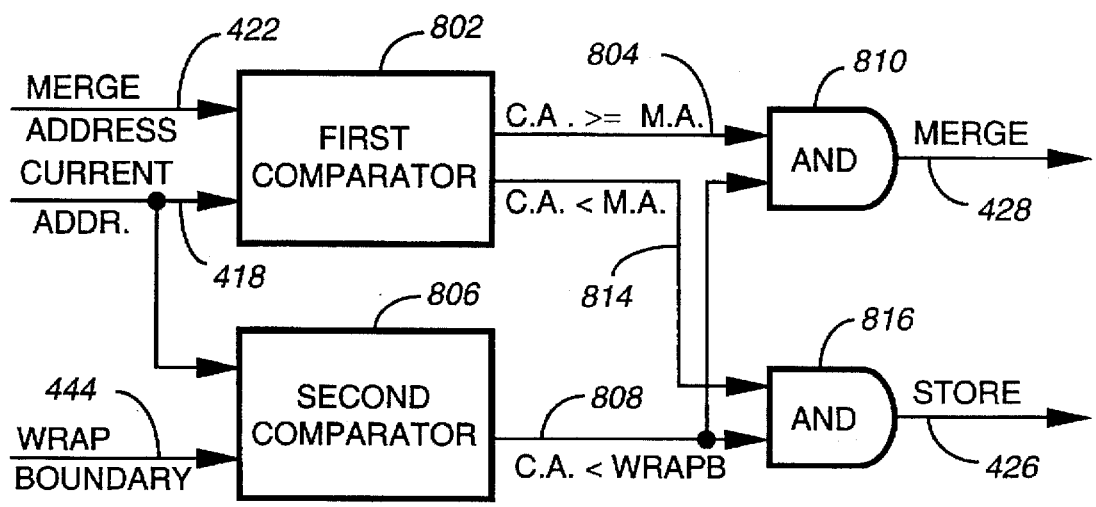
FIG. 9 is an electrical block diagram of a store/merge/ignore comparator in accordance with the preferred embodiment of the present invention.

FIG. 9 depicts an electrical block diagram of the store/merge/ignore comparator 424 in accordance with the preferred embodiment of the present invention. The store/merge/ignore comparator 424 comprises a first comparator 802 having inputs coupled to the merge address signal 422 and coupled to the current address 418. A first output 804 of the first comparator 802 is coupled to a first input of a logic circuit comprising a first conventional AND gate 810. The first output 804 is asserted (i.e., a logical "one") whenever the current address is greater than or equal to the merge address. A second output 814 of the first comparator 802 is coupled to a first input of a logic circuit comprising a second conventional AND gate 816. The second output 814 is asserted whenever the current address is less than the merge address.

The store/merge/ignore comparator 424 further comprises a second comparator 806 having inputs coupled to the current address 418 and coupled to the wrap boundary output 444. An output 808 of the second comparator 806 is coupled to second inputs of the first and second AND gates 810, 816. The output 808 is asserted whenever the current address 418 is less than the wrap boundary address presented at the wrap boundary output 444. The output of the first AND gate is the merge signal 428. The output of the second AND gate is the store signal 426.

Operation of the store/merge/ignore comparator 424 is such that when the current address 418 is less than the merge address (and thus also below the wrap boundary address), the store signal 426 is asserted. When the current address 418 is greater than or equal to the merge address and less than the wrap boundary address, the merge signal 428 is asserted. When the current address 418 is greater than or equal to the wrap boundary address, neither the store signal 426 nor the merge signal 428 is asserted, thereby indicating that the current symbol should be ignored. Preferably the first and second comparators 802, 806 are conventional comparators similar to the MC74HC85 magnitude comparator manufactured by Motorola, Inc. of Schaumburg, Ill. It will be appreciated that, alternatively, other similar components can be utilized as well for the first and second comparators 802, 806.

Figure 10:
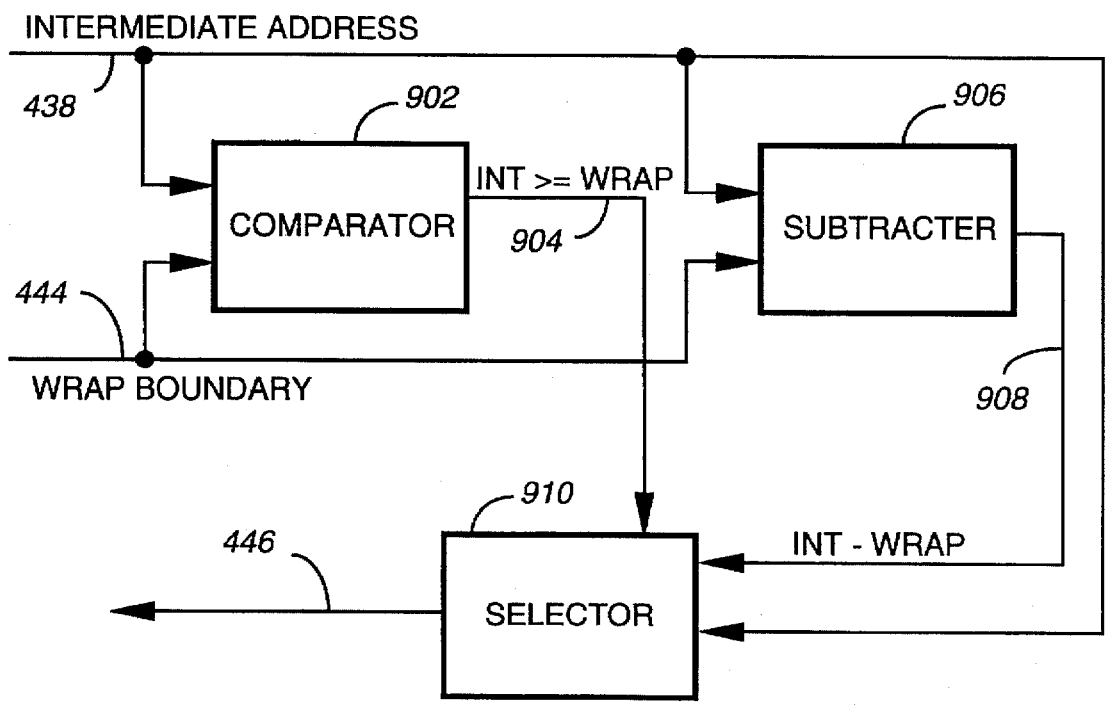
FIG. 10 is an electrical block diagram of a wrap boundary comparator in accordance with the preferred embodiment of the present invention.

FIG. 10 depicts an electrical block diagram of the wrap boundary comparator 440 in accordance with the preferred embodiment of the present invention. The wrap boundary comparator 440 comprises a conventional comparator 902 similar to the first and second comparators 802, 806. The inputs of the comparator 902 are coupled to the intermediate address 418 and coupled to the wrap boundary output 444. An output 904 of the comparator 902 is coupled to a control input of a selector 910. The output 904 is asserted whenever the intermediate address 438 is greater than or equal to the wrap boundary address.

The wrap boundary comparator 440 further comprises a subtracter 906 having inputs coupled to the intermediate address 438 and coupled to the wrap boundary output 444 for subtracting the wrap boundary address from the intermediate address 438 to produce a reduced address 908. The reduced address 908 and the intermediate address 438 are coupled to data inputs of the selector 910. The output of the selector is the selected memory address signal 446.

Operation of the wrap boundary comparator 440 is such that when the intermediate address 438 is less than the wrap boundary address, the selector 910 selects the intermediate address 438 as the selected memory address signal 446. When the intermediate address 438 is equal to or greater than the wrap boundary address, the selector 910 selects the reduced address 908 (i.e., the intermediate address 438 less the wrap boundary address) as the selected memory address signal 446.

The subtracter 906 is conventional, preferably comprising conventional logic gates and a full adder similar to the MC74HC283 full adder manufactured by Motorola, Inc. of Schaumburg, Ill. The selector 910 is also conventional and preferably constructed from octal three-state buffers, such as the MC74HC241 buffer manufactured by Motorola, Inc. of Schaumburg, Ill. It will be appreciated that, alternatively, other similar components can be utilized as well for the subtracter 906 and the selector 910.

Figure 11:
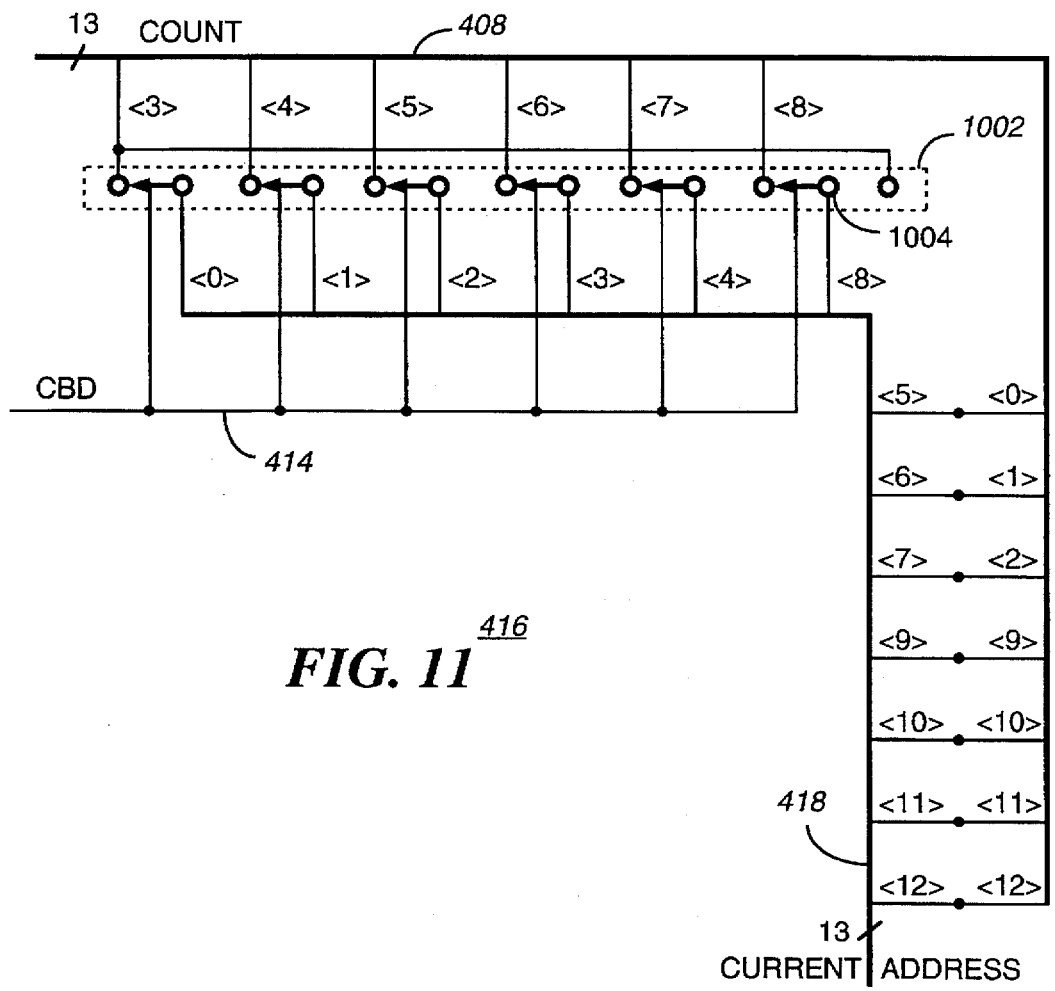
FIG. 11 is a simplified electrical diagram of a bit line translator in accordance with the preferred embodiment of the present invention.

FIG. 11 depicts a simplified electrical diagram of the bit line translator 416 in accordance with the preferred embodiment of the present invention. The bit line translator 416 comprises a code block depth adapter 1002 coupled to the code block depth signal 414 for adjusting the current address 418 according to a code block depth utilized in the frame of data. The code block depth adapter 1002 comprises a plurality of electronic switches 1004 in single-pole double-throw configuration and responsive to the code block depth (CBD) signal 414. The switches 1004 of the code block depth adapter 1002 are depicted in the 8×32 position, mapping the bits of the counter output 408 as shown in the 8×32 diagram 504 (FIG. 6). When the CBD signal is changed to indicate the 16×32 code block depth, the switches 1004 map the bits of the counter output 408 as shown in the 16×32 diagram 506 (FIG. 6). Preferably, the switches 1004 are constructed from conventional CMOS transmission gates similar to those utilized in the MC74HC4066 quad analog switch/multiplexer/demultiplexer manufactured by Motorola, Inc. of Schaumburg, Ill. It will be appreciated that, alternatively, other similar electronic switches can be utilized for the switches 1004.

It should be apparent by now that the present invention provides a method and apparatus for managing a current data symbol received in a frame of data of a time diversity communication system. The method and apparatus distinguishes new data from repeated data and stores the data in a manner that facilitates real-time intelligent merging of repeated data with previously stored data. Also, the method and apparatus advantageously has the flexibility to accommodate systems having different numbers of repeats and different code block depths, and utilizes battery power efficiently.

What is claimed is:

1. A method for managing a current data symbol received by a receiver in a frame of data of a time diversity communication system utilizing a repeated transmission of messages, the method comprising the steps of:

counting a signal from a symbol clock synchronized to the frame of data for providing a count of the current data symbol;

mapping a current address from the count;

deriving a selected memory address from the current address by conditionally processing the current address; and making a choice among (a) storing the current data symbol in a memory at the selected memory address, (b) merging the current data symbol with an earlier received data symbol stored at the selected memory address during an earlier frame of data, and (c) ignoring the current data symbol, wherein the choice made is based upon the current address.

2. The method of claim 1, wherein the step of making the choice comprises the steps of:
   comparing the current address with a predetermined merge address; and
   choosing (a), in response to the current address being less than the predetermined merge address.

3. The method of claim 1, wherein the step of making the choice comprises the steps of:
   comparing the current address with a predetermined merge address and further comparing the current address with a predetermined wrap boundary address; and
   choosing (b), in response to the current address being equal to or greater than the predetermined merge address and less than the predetermined wrap boundary address.

4. The method of claim 1, wherein the step of making the choice comprises the steps of:
   comparing the current address with a predetermined wrap boundary address; and
   choosing (c), in response to the current address being equal to or greater than the predetermined wrap boundary address.

5. The method of claim 1, wherein the step of mapping comprises the step of
   adjusting the current address according to a code block depth utilized in the frame of data.

6. The method of claim 1, wherein the step of mapping comprises the step of
   rearranging an order of bits representing the count to achieve de-interleaving of the frame of data by causing related symbols of a code word to be stored in increments of one in the memory.

7. The method of claim 1, further comprising the step of
   generating an end-of-frame signal in response to the count reaching a predetermined value.

8. The method of claim 1, wherein the step of deriving the selected memory address comprises the steps of:
   adding the current address to a predetermined address offset to determine an intermediate address;
   comparing the intermediate address with a predetermined wrap boundary address; and
   selecting the intermediate address as the selected memory address, in response to the intermediate address being less than the predetermined wrap boundary address.

9. The method of claim 8, wherein the step of deriving the selected memory address further comprises the steps of:
   subtracting the predetermined wrap boundary address from the intermediate address to derive a reduced address; and
   selecting the reduced address as the selected memory address, in response to the intermediate address being equal to or greater than the predetermined wrap boundary address.

10. A data symbol manager for managing a current data symbol received by a receiver in a frame of data of a time diversity communication system utilizing a repeated transmission of messages, the data symbol manager comprising:
    a symbol counter coupled to a symbol clock synchronized to the frame of data for providing a count of the current data symbol;
    a bit line translator coupled to the symbol counter for mapping a current address from the count;
    a conditional processor coupled to the bit line translator for deriving a selected memory address from the current address by conditionally processing the current address; and
    a store/merge/ignore comparator coupled to the bit line translator for making a choice among (a) storing the current data symbol in a memory at the selected memory address, (b) merging the current data symbol with an earlier received data symbol stored at the selected memory address during an earlier frame of data, and (c) ignoring the current data symbol, wherein the choice made is based upon the current address.

11. The data symbol manager of claim 10, further comprising a merge address register, and wherein the store/merge/ignore comparator comprises:
    a comparator coupled to the merge address register and coupled to the bit line translator for comparing the current address with a predetermined merge address; and
    a logic circuit coupled to the comparator for indicating a choice of (a), in response to the current address being less than the predetermined merge address.

12. The data symbol manager of claim 10, further comprising:
    a merge address register; and
    a wrap boundary register, and wherein the store/merge/ignore comparator comprises:
       a first comparator coupled to the merge address register and coupled to the bit line translator for comparing the current address with a predetermined merge address;
       a second comparator coupled to the wrap boundary register and coupled to the bit line translator for comparing the current address with a predetermined wrap boundary address; and
       a logic circuit coupled to the first and second comparators for indicating a choice of (b), in response to the current address being equal to or greater than the predetermined merge address and less than the predetermined wrap boundary address.

13. The data symbol manager of claim 10, further comprising a wrap boundary register, and wherein the store/merge/ignore comparator comprises:
    a comparator coupled to the wrap boundary register and coupled to the bit line translator for comparing the current address with a predetermined wrap boundary address; and
    a logic circuit coupled to the comparator for indicating a choice of (c), in response to the current address being equal to or greater than the predetermined wrap boundary address.

14. The data symbol manager of claim 10, wherein the bit line translator comprises
    a code block depth adapter coupled to a code block depth signal for adjusting the current address according to a code block depth utilized in the frame of data.

15. The data symbol manager of claim 10, wherein the bit line translator rearranges an order of bits representing the count to achieve de-interleaving of the frame of data by causing related symbols of a code word to be stored in increments of one in the memory.

16. The data symbol manager of claim 10, further comprising an end-of-frame generator coupled to the symbol counter for generating an end-of-frame signal in response to the count reaching a predetermined value.

17. The data symbol manager of claim 10, further comprising:

a first sub-frame address register; and a wrap boundary register, and wherein the conditional processor comprises:

an adder coupled to the bit line translator and coupled to the first sub-frame address register for adding the current address to a predetermined address offset to determine an intermediate address; and a wrap boundary comparator, comprising:

a comparator coupled to the adder and coupled to the wrap boundary register for comparing the intermediate address with a predetermined wrap boundary address; and a selector coupled to the adder and coupled to the comparator for selecting the intermediate address as the selected memory address, in response to the intermediate address being less than the predetermined wrap boundary address.

18. The data symbol manager of claim 17, wherein the wrap boundary comparator further comprises a subtracter coupled to the adder and coupled to the wrap boundary register for subtracting the predetermined wrap boundary address from the intermediate address to derive a reduced address, and wherein the selector is further coupled to the subtracter for selecting the reduced address as the selected memory address, in response to the intermediate address being equal to or greater than the predetermined wrap boundary address.

* * * * *